Figure 1:
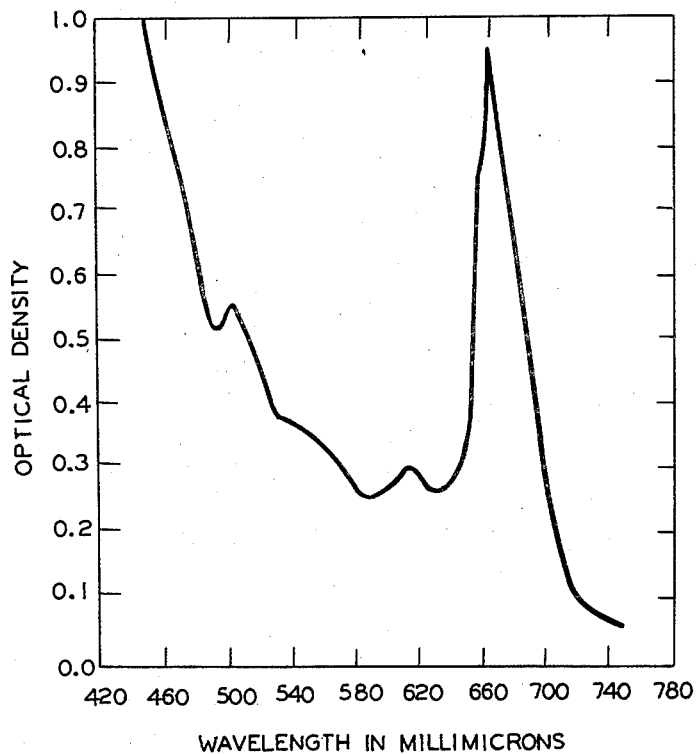

Sept. 3, 1963 E. A. ALLEN 3,102,891
NEW PORPHYRINIC AND CHLOROPHYLLIC
COMPOSITIONS AND PROCESS THEREFOR
Filed Nov. 16, 1959

INVENTOR.
ELMER A. ALLEN
BY
ATTORNEY

United States Patent Office 3,102,891
Patented Sept. 3, 1963

3,102,891
NEW PORPHYRINIC AND CHLOROPHYLLIC COMPOSITIONS AND PROCESS THEREFOR
Elmer A. Allen, Boling, Tex.
Filed Nov. 16, 1959, Ser. No. 853,119
4 Claims. (Cl. 260—314)

This invention relates to a process for the preparation of new compositions of porphyrinic and chlorophyllic compounds from dehydrated legumes and cereal grasses, and to the porphyrinic and chlorophyllic compositions obtained therefrom.

It is an object of this invention to provide a new method for the preparation of useful porphyrinic and chlorophyllic compounds from dehydrated legumes and cereal grasses. It is a further object of this invention to obtain new compositions of porphyrinic and chlorophyllic compounds having therapeutic activity. Other and further objects and advantages of this invention will become apparent from the following detailed description in conjunction with the accompanying graph, FIGURE 1, showing the absorption spectrum of the compositions claimed herein.

It has now been discovered that by the proper extractive treatment of dehydrated legumes and cereal grasses within certain conditions of pH and extractive solvent mixtures, distinct compositions consisting of mixtures of porphyrinic and chlorophyllic compounds are obtained. It has further been discovered that the compositions thus obtained have surprising therapeutic activity.

The term "legumes and cereal grasses" as used herein refers to forage crops such as clover, alfalfa, soybeans, sudan, etc. and to grasses yielding grain used for food such as oats, wheat, barley, rye, etc. While extractive treatment according to this invention will yield the desired compositions from these materials at substantially any stage of growth and development, higher yields and superior results are obtained by employing material which was cut just prior to flowering and which when dehydrated has optimum protein and vitamin A, has no scorched odor and is fresh green in color. For example, when dehydrated alfalfa meal is employed as a starting material it is generally preferred when containing not less than 17% crude protein, being green in color and containing greater than 150,000 international units of vitamin A per pound. While any form of legume or cereal grass having a water content below about 10% by weight may be used, it is preferred to use a material containing less than 6% by weight water.

As legumes and cereal grasses contain a multitude of natural products which are soluble in various organic solvents and combustions of organic solvents, it is necessary to extract initially with a solvent which will remove the desired compounds while at the same time removing a minimum of the undesired compounds which prevent or at least complicate the proper operation of the separation procedure. This is accomplished by initially extracting the desired dehydrated legume or cereal grass with a solvent consisting of a liquid aliphatic hydrocarbon containing form 6 to 12 carbon atoms, and a lower monohydric alkanol containing from 1 to 10 carbon atoms in the volume ratios of from 2:1 to 8:1 parts of aliphatic hydrocarbon to parts of alkanol. For optimum results and yield it is definitely preferred to employ a solvent consisting of a liquid aliphatic hydrocarbon containing from 6 to 7 carbon atoms and an alkanol containing from 3 to 4 carbon atoms in a volume ratio of from 3:1 to 5:1 aliphatic hydrocarbon to alkanol. After extraction, the legume or cereal grass extract and the spent solids are separated by filtration or other suitable means. The filtrate therefrom contains the extract in a mixture of aliphatic hydrocarbon, alkanol and water which is derived from moisture in the legume or cereal grass. This mixture is then distilled to remove the alkanol, which is conveniently removed as a ternary azeotrope of aliphatic hydrocarbon, alkanol and water. During the distillation, additional aliphatic hydrocarbon may be added as necessary to maintain the azeotrope and to assure substantially complete removal of the alkanol and water. To the remaining mixture of extract in aliphatic hydrocarbon is then added an alkanol having a shorter carbon chain than the one previously removed and preferably being methanol. This shorter-chained alkanol is added in a quantity sufficient to accomplish a solvent exchange. This said exchange is preferably accomplished by azeotropic distillation. The solution obtained at this point is the extract in lower alkanol, preferably methanol. An alcoholic solution of alkali metal hydroxide is then added until an alcoholic pH of 11.5 to 11.8 is obtained. The temperature of the solution of alfalfa extract in lower alkanol should be maintained at a temperature of between 120 degrees C. and the boiling point of the solution during the addition of the alcoholic alkali metal hydroxide solution with the more uniform product being produced at or near the boiling point. After the alkali metal hydroxide addition is complete, the solution is cooled. It has generally been found advantageous to allow the solution to stand 2-6 hours. The solution is then filtered or separated by other suitable means to remove a dark undesirable residue. The filtrate containing the saponified alfalfa extract in lower alkanol is then extracted by liquid-liquid extraction with an aliphatic hydrocarbon to remove the carotenoids in the hydrocarbon layer. After extraction of the carotenoids with a hydrocarbon, the alafalfa extract in lower alkanol is separated from the hydrocarbon layer and concentrated by some suitable means such as evaporation or distillation until substantially all of the lower alkanol has been removed to produce an alfalfa extract concentrate. This concentrate is diluted with demineralized water, in an amount at least sufficient for hydrolysis of all the salts therein, and the pH is adjusted to from 3.4 to 3.6 with a mineral acid. It is generally convenient, however, to use proportions of from 4 to 7 parts by weight of water per part of extract concentrate. A mixture of porphyrinic and chlorophyllic compounds in the acid form precipitates out in a period of from about 1 to 3 hours to form a slurry. The solid acids thus obtained are separated form the liquid, air dried at moderate temperatures and dissolved in a lower alkanol, preferably having 1-4 carbon atoms, with methanol being most preferred. To this soltuion is then added an alkali metal hydroxide to a pH of 8.4 to 8.6, in order to convert the free acids to the alkali metal salts. If the pH is not at least 8.4, some free acid will remain rendering the product somewhat impure and therefore unsuitable for many clinical uses. If the pH exceeds 9.0, the chlorophyll contained in the product will begin decomposition and change both the composition of the product and the ratio of products contained therein. The alkali metal salt thus prepared may then be isolated by standard techniques such as distillation and extraction.

While any alkali metal hydroxide is operable for the neutralization and saponifications herein, the sodium and potassium hydroxides are generally preferred. They are particularly preferred in the last step of the process wherein a pH of 8.4 to 8.6 is required to produce the metal salts of the free acids.

Upon separation, the product is a free-flowing crystalline solid, blue-green in color which tends to be hygroscopic and which has a characteristic odor. It is easily soluble in polar compounds such as water and alcohol and is insoluble in non-polar solvents such as aliphatic and aromatic hydrocarbons, ether and acetone. A 1% by weight solution of this product in water at 20 degrees C. gives a pH of 8.5. The composition thus obtained contains from 35 to 65 weight percent porphyrinic compounds and from 35 to 65 weight percent chlorophyllic compounds with a 50–50 weight percent mixture being preferred.

FIGURE 1 represents a characteristic absorption spectrum of the composition and the absorption spectrum of the product prepared by Example 1 herein. The ordinate is shown to be optical density and the abscissa is shown to be the wavelength in millimicrons. In order to obtain this curve, a solution of 0.0296 gm. of the product of Example 1 herein in 25 ml. methanol was prepared. The spectrum was then obtained with a standard recording spectrograph. It will be noted that characteristic absorption occurs at about 660, 600 and 500 millimicrons. In addition an off-set generally occurs at about 540 millimicrons.

Due to the nature of the starting material and complex mixtures involved herein, it is not possible to obtain a mixture of compounds of identical composition with each extractive cycle. The typical curve illustrated by FIG. 1 may therefore shift as much as ±15 millimicrons and still be a composition within the scope of this invention and still retain its therapeutic activity. By way of illustration, the strong peak at 660 millimicrons may occur as low as 635 and as high as 675.

The compositions described herein, being extracted from alfalfa and not chemically modified except for conversion to the alkali metal salts, are non-toxic to animals and humans. In addition to this, however, these compositions show marked therapeutic activity, particularly in the treatment of hypercholesteremia. It has been demonstrated that hypercholesteremia may be effectively treated with the compositions described herein. In addition, it has been found that the compositions show surprising activity in the treatment of cardiovascular and hypertension arteriosclerosis as evidenced by substantial reductions in blood pressure and by improvement in blood characteristics as determined by standard methods.

Even more surprising is the marked activity of these compositions in the treatment of arthritis as evidenced by reduction of pain and increased motility of the affected part.

*Example 1*

1000 pounds of commercial dehydrated alfalfa meal was thoroughly mixed with 600 gallons of a solution containing heptane and isopropanol in a volume ratio of 4:1 heptane to isopropanol to form a slurry. After agitation of this slurry for 90 minutes, it was filtered to remove the remaining solid material. The filtrate now contained alfalfa extract, heptane, isopropanol and water from the alfalfa. This filtrate was then distilled to remove the isopropanol and water as a heptane-isopropanol-water azeotrope at 70.5 degrees C. After all water had been removed, the overhead temperature rose to 75.2 degrees C. which is a binary azeotrope between heptane and isopropanol. During the distillation, sufficient additional heptane was added to maintain the azeotrope. Distillation was continued until substantially no isopropanol or water remained and a take-off or overhead temperature of 98 degrees C. was reached whereupon the remaining solution was evaporated until the extract was contained in about 25 gallons of heptane. To the remaining solution of alfalfa extract in heptane was added 100 gallons of methanol. The solution was then distilled to remove the heptane-methanol azeotrope at 58.6 degrees C. Upon reaching an overhead temperature of 65 degrees C., the distillation was discontinued. The remaining hot solution of alfala extract in methanol was agitated and to it was slowly added a solution of KOH in methanol until an alcoholic pH of 11.7 was obtained. The solution was then cooled to room temperature, allowed to stand for about 4 hours and filtered. The filtrate therefrom, which was the alfalfa extract in methanol, was then passed through a column of heptane in the standard manner for liquid-liquid extraction to remove the fat solubles in the heptane layer, leaving the extract in the methanol layer. The methanol layer was separated from the heptane layer and the methanol was removed therefrom by distillation to a bottoms temperature of about 100 degrees C. To the concentrated extract remaining (approximately 10 pounds) was added 60 gallons of demineralized water. The mixture was agitated, the pH was adjusted to 3.5 with HCl, and the mixture was allowed to stand in a glass-lined vessel for 3 hours to allow complete precipitation of solids. The slurry thus obtained was then passed through a leaf and frame filter using inert filter cake. The solids thus removed were air dried and dissolved in 60 gallons of methanol giving an alcoholic solution of the porphyrinic and chlorophyllic composition as acids. To this stirred solution was then added KOH in methanol until an alcoholic pH of 8.5 was obtained, whereupon the solution was filtered. A majority of the methanol was removed from the filtrate by distillation at atmospheric pressure. A vacuum was then applied and the remainder of the methanol was removed at pressures gradually reduced down to about 1 p.s.i.a. The solid product, upon vacuum drying, was a free-flowing crystalline solid which was dark blue-green in color and had a characteristic odor. It was easily soluble in highly polar compounds such as water and alcohol and insoluble in non-polar solvents such as aromatic and aliphatic hydrocarbons, ether and acetone. A 1 weight percent solution of this product in water was prepared at 20 degrees C. and was found to have a pH of 8.5. Spectrographic metal analysis of the product showed it to contain 7.36% potassium. An ashed sample of the product was shown by spectrographic metal analysis to contain 44% K, 4.0% Na, 1.0% Mg, 0.7% Ca, 0.4% Si, 0.1% Fe and small amounts of other metals such as aluminum, chromium, copper, manganese, nickel, titanium, vanadium and others.

The analysis obtained employing a standard recording spectrograph is shown in FIGURE 1. Characteristic absorption is shown at 663, 611 and 502 millimicrons showing the presence of both porphyrinic and chlorophyllic compounds in concentrations of 50 weight percent porphyrinic compounds and 50 weight percent chlorophyllic compounds.

*Example 2*

In order to demonstrate the therapeutic activity of the composition prepared in accordance with Example 1, nine clinical patients, both male and female, showing chronic high blood cholesterol were given daily oral doses of 1.0 gm per day of the composition for a period of 30 days with the following results:

| Patient No. | Initial cholesterol | Final cholesterol |
| --- | --- | --- |
| 1 | 334 | 239 |
| 2 | 400 | 228 |
| 3 | 410 | 346 |
| 4 | 435 | 285 |
| 5 | 395 | 280 |
| 6 | 360 | 260 |
| 7 | 380 | 220 |
| 8 | 354 | 220 |
| 9 | 390 | 310 |

I claim:

1. A process for the preparation of alkali metal salts of porphyrinic and chlorophyllic compounds which comprises extracting a member of the group consisting of legumes and cereal grasses having a water content of less than 10 weight percent with a salvent consisting essentially of an unsubstituted liquid alkyl hydrocarbon containing from 6 to 12 carbon atoms, and a lower monohydric alkanol containing from 2 to 10 carbon atoms in a volume ratio of from 2:1 to 8:1 aliphatic hydrocarbon to lower monohydric alkanol, distilling the extract thus obtained to remove the water and lower monohydric alkanol therefrom, adding to the residue of said distillation a lower monohydric alkanol having a shorter carbon chain than the alkanol used for initial extraction, in sufficient quantity for solvent exchange, distilling to remove the aliphatic hydrocarbon, adding an alcoholic solution of an alkali metal hydroxide to the residue from said distillation to an alcoholic pH of from 11.5 to 11.8, said residue being maintained between 120 degrees C. and its boiling point during said addition of the alkali metal hydroxide, cooling the mixture, separating any solids therefrom, extracting said mixture with an aliphatic hydrocarbon having from 6 to 12 carbon atoms, separating the alkanol mixture from the hydrocarbon mixture, removing substantially all lower monohydric alkanol from the alkanol mixture, adding water to the residue therefrom in an amount at least sufficient for hydrolysis thereof, adjusting the pH thereof to from 3.4 to 3.6 with a mineral acid, allowing crystallization of the solid porphyrinic and chlorophyllic compounds, separating the said solids therefrom, dissolving said solids in a lower monohydric alkanol having from 1 to 4 carbon atoms, adding an alcoholic solution of an alkali metal hydroxide thereto to a pH of 8.4 to 8.6 and recovering the alkali metal salts of porphyrinic and chlorophyllic compounds therefrom.

2. A process for the preparation of a mixture of potassium salts of porphyrinic and chlorophyllic compounds which comprises extracting dehydrated alfalfa having a water content of less than 6 weight percent with a solvent consisting essentially of n-heptane and isopropanol in a volume ratio of 4:1 n-heptane to isopropanol, distilling the extract thus obtained to remove water and the isopropanol therefrom, adding methanol to the remaining n-heptane-extract mixture in a quantity sufficient for solvent exchange, removing the lower aliphatic hydrocarbon from said mixture by distillation, adding an alcoholic solution of KOH to the residue from said distillation to an alcoholic pH of 11.7, said mixture being maintained at substantially its boiling point during said KOH addition, cooling the mixture to about room temperature, allowing the mixture to stand for about 4 hours, filtering to remove any solids formed therein, extracting said mixture with n-heptane, separating the methanol layer from the n-heptane layer, distilling the methanol layer to remove substantially all methanol therefrom, adding demineralized water to the residue from said distillation in the proportion of about 6 parts by weight of water per part of methanol mixture residue, adding hydrochloric acid thereto with agitation until a pH of 3.5 is obtained, allowing the mixture to stand until the solid porphyrinic and chlorophyllic compounds have crystallized from solution, filtering to remove said solids, dissolving said solids in methanol, adding alcoholic KOH to an agitated solution thereof to obtain an alcoholic pH of 8.5, filtering the solution and vacuum drying the solid potassium salts of porphyrinic and chlorophyllic compounds.

3. A composition of matter derived from legumes and cereal grasses and consisting essentially of a mixture of the alkali metal salts of porphyrinic and chlorophyllic compounds, the mixture containing from 35 to 65 percent porphyrinic compounds and the balance substantially chlorophyllic compounds, said mixture having the form of a free-flowing solid, being soluble in polar solvents and insoluble in non-polar solvents, having a dark blue-green color, having a pH of 8.5 as a 1 percent by weight solution in water at 20° C., and when suspended in methanol exhibiting a characteristic absorption which is that shown in FIGURE 1 of the drawing herein.

4. A composition of matter derived from legumes and cereal grasses and consisting essentially of a mixture of the potassium salt of mixed porphyrinic and chlorophillic compounds, the mixture containing from 35 to 65 percent porphyrinic compounds and the balance substantially chlorophyllic compounds, said mixture having the form of a free-flowing solid, being soluble in polar solvents and insoluble in non-polar solvents, having a dark blue-green color, having a pH of 8.5 as a 1 percent by weight solution in water at 20° C., and when suspended in methanol exhibiting a characteristic absorption which is that shown in FIGURE 1 of the drawing herein.

References Cited in the file of this patent

UNITED STATES PATENTS

| | | |
|---|---|---|
| 2,274,102 | Snyder | Feb. 24, 1942 |
| 2,567,362 | Berkman et al. | Sept. 11, 1951 |